(12) United States Patent
Kotecha et al.

(10) Patent No.: US 9,537,561 B1
(45) Date of Patent: Jan. 3, 2017

(54) OPTIMIZATION OF COMMUNICATIONS WITH UAVS USING TERRESTRIAL CELLULAR NETWORKS

(71) Applicant: Verizon Patent and Licensing Inc., Arlington, VA (US)

(72) Inventors: Lalit R. Kotecha, San Ramon, CA (US); Sudhakar Reddy Patil, Westlake, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 15/003,271

(22) Filed: Jan. 21, 2016

(51) Int. Cl.
| | | |
|---|---|---|
| *H04W 40/00* | (2009.01) |
| *H04B 7/185* | (2006.01) |
| *H04W 64/00* | (2009.01) |
| *H04B 7/08* | (2006.01) |
| *H04W 88/16* | (2009.01) |

(52) U.S. Cl.
CPC ......... *H04B 7/18506* (2013.01); *H04B 7/086* (2013.01); *H04W 64/003* (2013.01); *H04W 88/16* (2013.01)

(58) Field of Classification Search
CPC .. G08G 5/0069; G08G 5/0034; G08G 5/0013; G08G 5/045; G08G 5/003; G08G 5/0039; G08G 5/006; G08G 5/0086; G08G 5/0082; G08G 5/0091
USPC .................. 455/404.2, 418, 419, 432.3, 436, 432.1, 455/428
See application file for complete search history.

(56) References Cited

U.S. PATENT DOCUMENTS

| | | | |
|---|---|---|---|
| 2010/0039984 A1* | 2/2010 | Brownrigg ......... | H04B 7/18584 370/316 |
| 2016/0180719 A1* | 6/2016 | Wouhaybi et al. .. | G08G 5/0082 701/4 |

* cited by examiner

*Primary Examiner* — Tu X Nguyen

(57) ABSTRACT

A UAV gateway may be used to assist in the optimization of communications between a UAV and a cellular wireless network. The UAV may include a steerable, multi-faceted antenna array. In one implementation, the UAV may receive, from the cellular wireless network, network description information, describing the physical state of the cellular wireless network. The network description information may include, for example, locations of base stations near the UAV, transmit power associated with the base stations (or with cells provided by the base stations), and/or the transmit antenna patterns associated with the base stations. The UAV may use this information to optimize its communications with the cellular network.

20 Claims, 10 Drawing Sheets

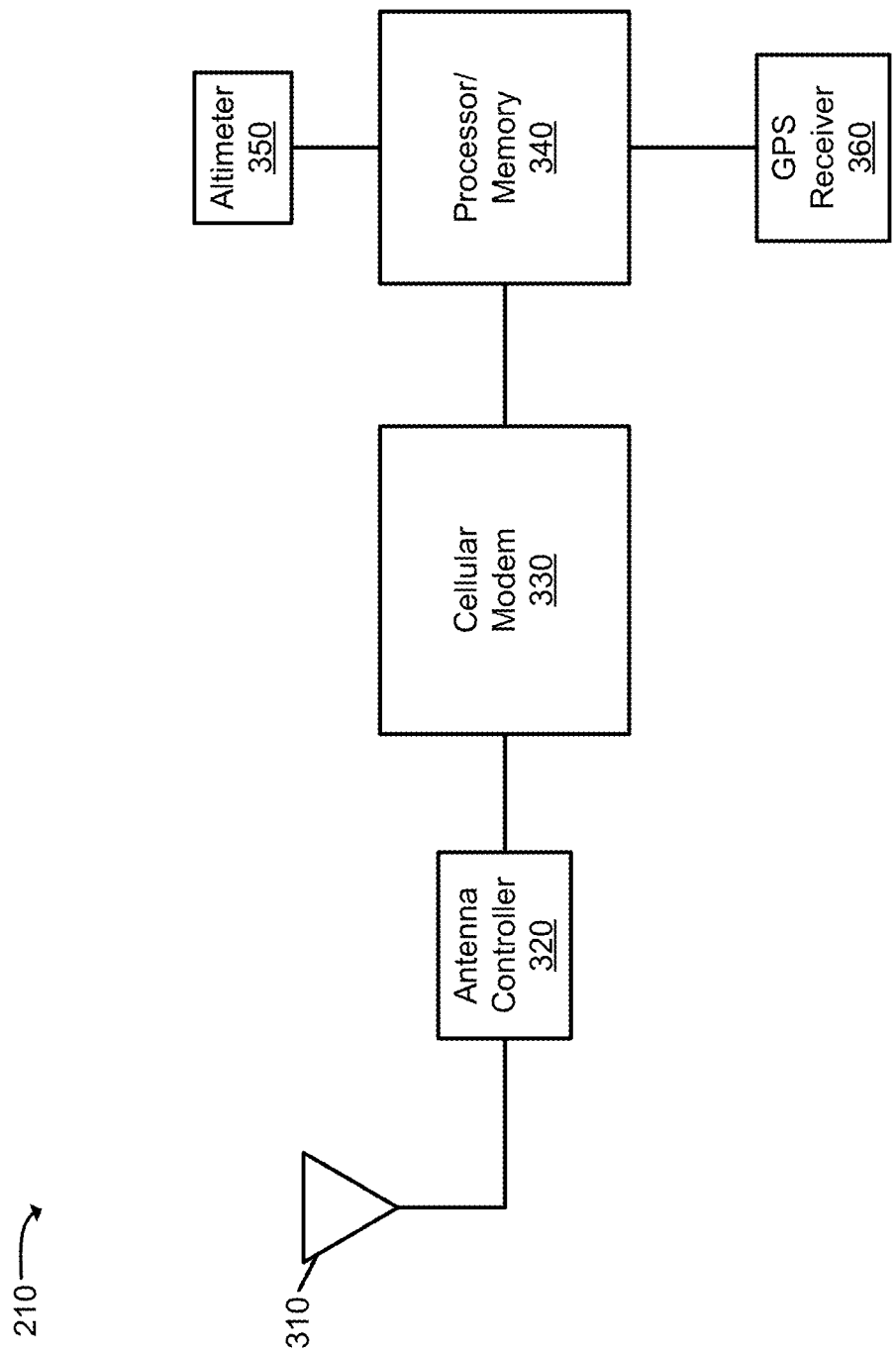

500 →

| Cell/Facet | SiNR | RSSI |
|---|---|---|
| Cell1/Facet1 | 10 dB | -85 dBm |
| Cell1/Facet2 | 15 dB | -80 dBm |
| Cell2/Facet1 | 20 dB | -70 dBm |
| Cell2/Facet2 | 25 dB | -60 dBm |
| ⋮ | ⋮ | ⋮ |

Fig. 5

OPTIMIZATION OF COMMUNICATIONS WITH UAVS USING TERRESTRIAL CELLULAR NETWORKS

BACKGROUND

"Unmanned Aerial Vehicles" (UAVs) (sometimes referred to as "drones," Remotely Piloted Aircraft (RPA), or Unmanned Aerial Systems (UASs)) refer to aircraft without a human pilot aboard. The flight of a UAV may be controlled either autonomously (e.g., by onboard and/or remote computers) or by remote control of a pilot. Proposals for using UAVs include using UAVs for the delivery of payloads (e.g., packages) and remote monitoring and/or sensing (e.g., monitoring of crops or pipelines).

In either autonomous or remote control operation, it may be desirable that the UAV maintain network connectivity to the command and control location (i.e., the physical location of the pilot and/or control processes). Wireless cellular networks may be used to provide network connectivity to UAVs, as existing wireless cellular networks already cover large geographical areas. Current wireless cellular networks, however, are designed and optimized for communications at ground level.

BRIEF DESCRIPTION OF THE DRAWINGS

Embodiments of the present invention will be readily understood by the following detailed description in conjunction with the accompanying drawings. To facilitate this description, like reference numerals may designate like structural elements.

FIG. 3 is a diagram illustrating an example of components of a UAV;

FIG. 5 is a diagram illustrating an example data structure that may be used by a UAV to store received signal strength values;

DETAILED DESCRIPTION OF PREFERRED EMBODIMENTS

The following detailed description refers to the accompanying drawings. The same reference numbers in different drawings may identify the same or similar elements.

Techniques described herein are used to optimize communications of a UAV to radio access network (RAN) of a cellular wireless network. The UAV may include a steerable, multi-faceted antenna array. In one implementation, the UAV may receive, from the cellular wireless network, network description information, describing the physical state of the cellular wireless network. The network description information may include, for example, locations of base stations near the UAV, transmit power associated with the base stations (or with cells provided by the base stations), and/or the transmit antenna patterns associated with the base stations. With this information, the UAV may be informed of the existing cellular network coverage. The UAV may use this information to optimize its communications with the cellular network. For example, the UAV may adaptively control the steerable antenna array to steer UAV transmissions in the direction of the base station to which the UAV is connected.

Additionally, as described herein, a UAV gateway device may be used to coordinate communications with the UAVs and to control the providing of the network description information to the UAVs. In some implementations, the UAV gateway device may potentially be associated with multiple cellular network providers, and may assist UAVs in determining an optimal cellular network provider for a particular flight path or segment of a flight path.

Additionally, in some implementations the UAV may independently measure signal strength of different ones of the antenna facets. The measured signal strengths associated with the strongest of the antenna facets may be provided to the cellular wireless network. The cellular wireless network may make handover decisions based on the signal strength information corresponding to the strongest of the antenna facets and the UAV may use the signal strength information to determine the antenna facets to use when connecting to the network.

Figure 1:
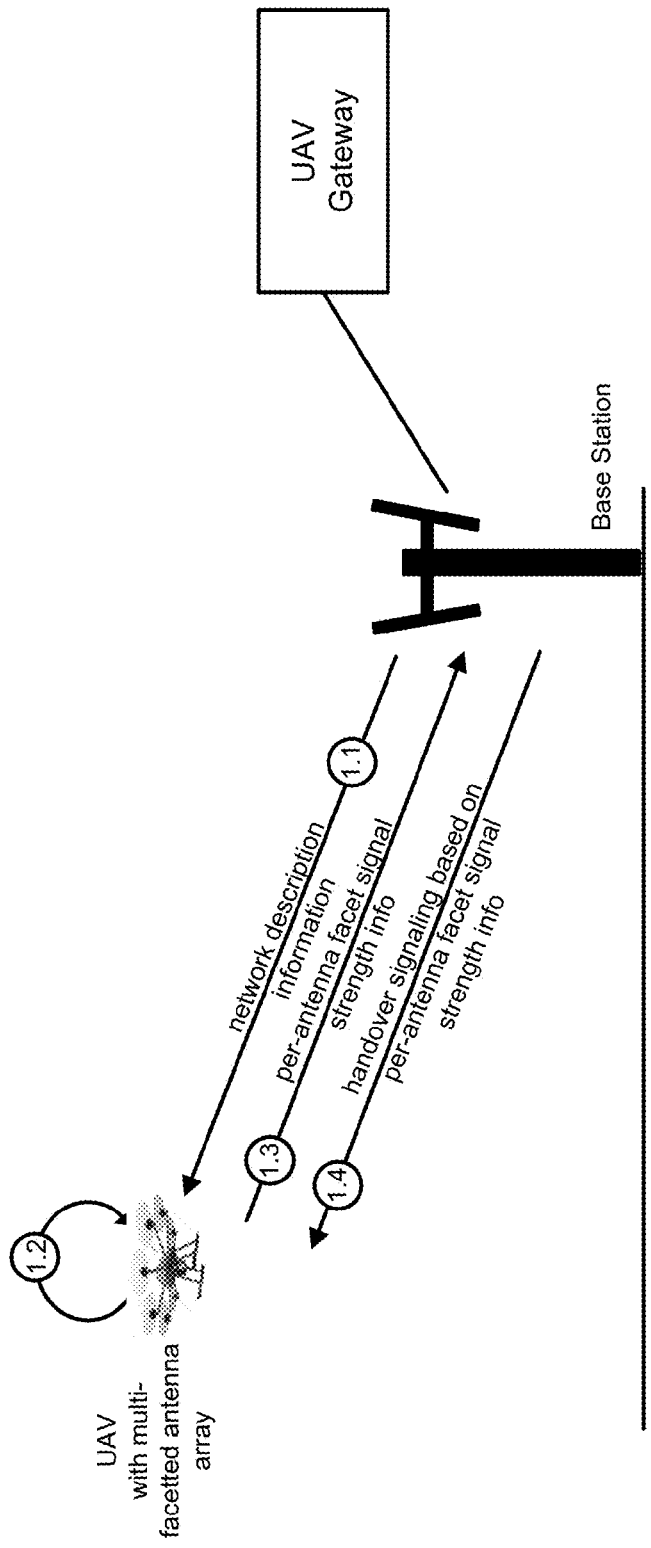
FIG. 1 is a diagram illustrating an example of an overview of concepts described herein.

FIG. 1 is a diagram illustrating an example of an overview of concepts described herein. As shown in FIG. 1, a UAV may be associated with a multi-faceted antenna array. The multi-faceted antenna array may include a number of antenna elements (facets), where each of the antenna facets may point in a different direction relative to the orientation of the UAV. The UAV may perform beam forming techniques in order to use one or more of the antenna facets to transmit a radio signal in a particular direction. Alternatively or additionally, the UAV may independently use the antenna facets, such as by selecting and using one of the antenna facets based on the direction in which the antenna facet points (and potentially not using, or independently using, the other antenna facets).

As is further shown in FIG. 1, a base station, such as a base station that operates as part of the RAN of a wireless cellular network, may provide the radio interface for the UAV. A UAV gateway, such as gateway associated with the network provider of the wireless cellular network, or a gateway associated with multiple wireless cellular networks, may assist in coordinating and controlling the operation of the UAV. The UAV gateway may, for example, maintain network description information relating to the geographical locations of the base stations and information describing radio transmission parameters of the base stations.

The UAV gateway may, at certain times, transmit the network description information to the UAV (at 1.1, "network option information"). The UAV may use the network information to optimize connections to the base station, or to other base stations associated with the cellular wireless network (at 1.2). For example, the UAV may use information relating to the location of base stations, in the vicinity of the UAV, to steer the UAV antennas to point to the base stations. As another example, the UAV may use information about coverage gaps in the network to adjust the flight path of the UAV and/or to schedule data transmissions.

The UAV may additionally measure signal strength information, corresponding to signals received from the cellular network, on a per-antenna facet (and potentially per-base station or cell) basis (at 1.3, "per-antenna facet signal strength info"). The UAV may report the per-antenna facet signal strength information to the base station, such as by reporting only the signal strength information corresponding to the strongest antenna facet to the base station. The network may use the reported signal strength information to control handovers in the network (at 1.4, "handover signaling based on per-antenna facets signal strength info").

Figure 2:
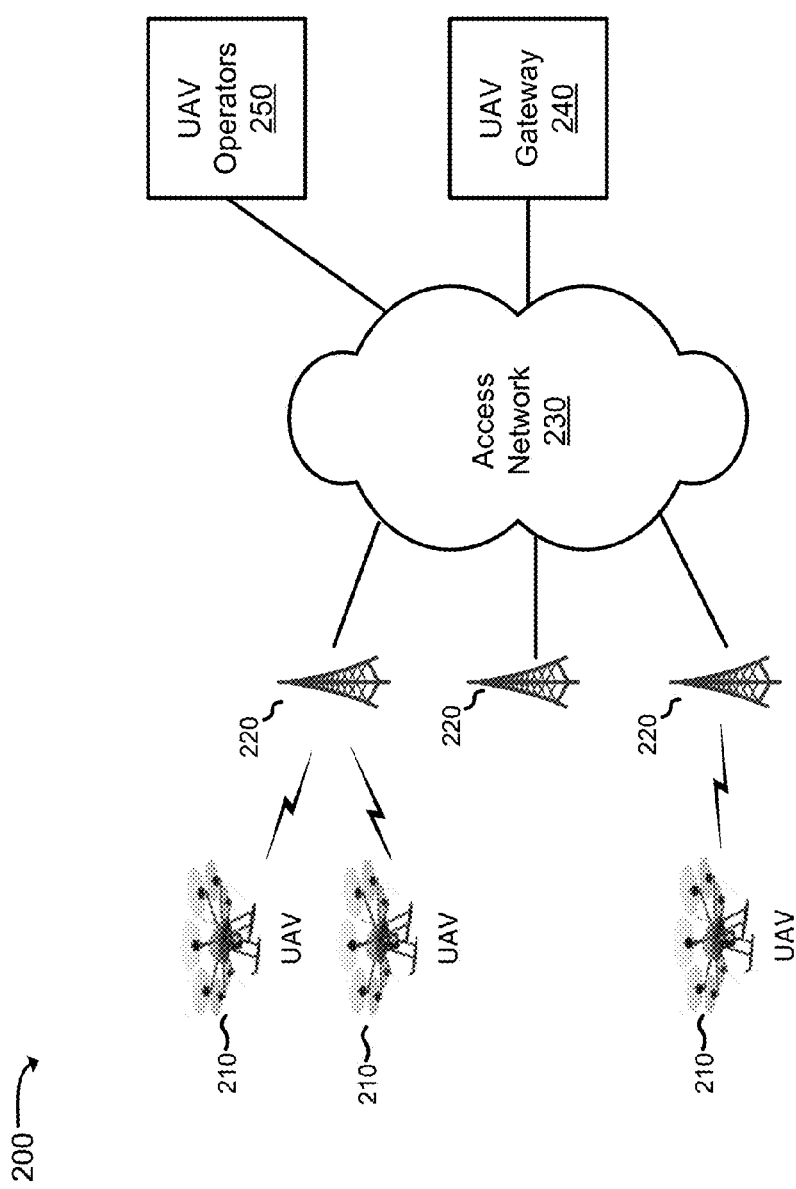
FIG. 2 is a diagram illustrating an example environment in which systems and/or methods described herein may be implemented.

FIG. 2 is a diagram illustrating an example environment 200 in which systems and/or methods described herein may be implemented. As shown, environment 200 may include one or more UAVs 210, base stations 220, access network 230, and UAV gateway 240.

UAVs 210 may each include a remotely piloted aerial device, such as a quadcopter or other helicopter-based design, a winged flying device, a blimp, etc. UAVs 210 may be operated by UAV operators 250 that may include public or private entities that may use UAVs to deliver payloads or to provide other UAV-based services (e.g., landscape monitoring or photography, agricultural services, etc.). UAVs 210 may each include radio communication equipment that enables UAV 210 to wirelessly communicate with a cellular wireless network, such as one implemented by base stations 220 and access network 230.

Base stations 220 may include base stations for a wireless cellular network. Each base station 220 may include one or more radio transceivers to provide wireless connections to mobile devices (such as UAVs 210). In the context of a Long Term Evolution (LTE) network, base station 220 may be implemented by an Evolved Node B (eNodeB). In the context of a Global System for Mobile (GSM) communications network, base station 220 may be implemented by a base transceiver station (BTS). Base stations 220 may also include small cells, such as femtocells, microcells, etc. Base stations 220 may generally function to provide an air (radio) interface over a large geographical area. Base stations 220 may be geographically arranged to each provide coverage for a limited geographical area (a "cell"). Mobile devices, such as UAVs 210, when moving in and out of the coverage area of particular base stations 220 or cells, may be "handed off" (also called a handover operation) to different base stations or cells to receive, from the standpoint of the mobile device, uninterrupted network coverage.

Access network 230 may represent a network, such as one implemented by the operator of base stations 220, that is used to connect base stations 220 and to provide network management and backhaul functionality. Access network 230 may also provide connectivity to mobile devices, such as UAVs 210, and to external servers or networks, such as to UAV operator 250.

In an implementation in which the wireless network includes an LTE-based network, access network 230 may include an evolved packet core (EPC) network that operates based on a third generation partnership project (3GPP) wireless communication standard. The EPC network may include one or more serving gateways (SGWs), mobility management entities (MMEs), and/or packet data network gateways (PGWs).

Access network 230 may be additionally associated with UAV gateway 240. UAV gateway 240 may include one or more computing devices that act to control or coordinate communications with UAVs 210. For example, through UAV gateway 240, UAV operators 250 may register UAVs 210 with access network 230, obtain information relating to the state of access network 230 (e.g., expected network connectivity over a flight path), and/or control the operation of UAVs 210. UAV gateway 240 may be implemented as part of access network 230 and/or external to access network 230. In one implementation, UAV gateway 240 may include an Application Programming Interface (API) that is designed to provide access, to UAV operators 250, to UAV commands relating to control of UAVs 210 or to obtain information relating to the state of access network 230 or base stations 220, as the state pertains to a particular UAV 210. The commands relating to control may include, for example, commands that allow UAV operator 250 to control the speed, direction, and height of UAVs 210.

UAV gateway 240 may particularly include logic to provide UAVs 210 with information that can be used to optimize control of antennas associated with UAV 210. In one implementation, UAV gateway 240 may store network description information, such as the physical location of base stations 220, information describing the current transmit power associated with base stations 220 (or cells provided by the base stations), and/or information describing the current radiation patterns or antenna patterns associated base stations 220. Based on the current location of a particular UAV 210, UAV gateway 240 may transmit network description information that is relevant to the particular UAV 210 (e.g., network description information relating to the base stations in a vicinity of UAV 210). UAV 210 may use the network description information to optimize antenna settings of the multi-faceted antenna array (e.g., perform beamforming, selection of particular antenna facets to use, etc.).

UAV operators 250 may each represent an operator of one or more UAVs 210. Through wireless communications with the UAVs, UAV operators 250 may control flight paths taken by UAVs 210 and other operations performed by UAVs 210. UAV operators 250 may manually or automatically (or a combination of manual and automatic) control the UAVs.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200.

FIG. 3 is a diagram illustrating example of components of a UAV 210. The components of UAV 210, as shown in FIG. 3, may generally relate to the electronic and/or logic elements of UAV 210 in performing the techniques described herein. As shown in FIG. 3, UAV may include antenna 310, antenna controller 320, cellular model 330, processor/memory 340, altimeter 350, and Global Positioning System (GPS) receiver 360. UAV 210 may include other components that are not shown in FIG. 3, such as batteries, motors, etc.

Antenna 310 may be a multi-faceted directional antenna that is capable of being controlled to radiate or receive power in specific directions. For example, antenna 310 may include an array of antenna facets that are arranged to point in different directions (e.g., arranged around a curving region). Antenna 310 may also be adaptive in that the directionality of antenna 310 can be changed. For example, antenna 310 may be implemented as an antenna that can be controllably tilted about one or more axes. Alternatively or additionally, antenna 310 may be arranged as an array of fixed antenna facets in which beamforming may be performed to combine the antenna facets in a phased array in such a way that signals at particular angles experience constructive interference while others experience destructive interference. Beamforming is a known technique for changing the directionality of an adaptive antenna. Still further, in some implementations, different ones of the antenna facets can be selectively turned on and off.

Antenna controller 320 may include a processor, circuit, or other logic to control antenna 310. For example, when antenna 310 is an antenna array, antenna controller 310 may change the directionality of the array by combining information received at different antenna elements in a way where the expected pattern of radiation is preferentially observed. Antenna controller 320 may control antenna 310 based on antenna directionality information received from processor/memory 340.

Cellular modem 330 may include a modem for use with the cellular wireless network. Cellular modem 330 may particularly represent UE logic associated with an LTE network. Cellular modem 330 may, for example, provide protocol and interface logic for communicating with access network 230.

Processor/memory 340 may represent a processor, microprocessor, or processing logic that may include processing circuitry to interpret and execute instructions that are stored in memory. The memory of processor/memory 340 may include any type of volatile or non-volatile storage device that may store information and software instructions for execution by processor 820. For example, the memory of processor/memory 340 may include a non-transitory computer-readable medium. The memory may include space within a single physical memory device or spread across multiple physical memory devices. The software instructions may cause the processor to perform processes described herein. Alternatively, hardwired circuitry may be used in place of or in combination with software instructions to implement processes described herein. Thus, implementations described herein are not limited to any specific combination of hardware circuitry and software.

Altimeter 350 may include a meter to measure the altitude of UAV 210. The altitude measurement may be provided to processor/memory 340. For the techniques described herein, the altitude (height) of UAV 210 above ground level may be desired. In some implementations, altimeter 350 may directly generate this value for processor/memory 340. Alternatively or additionally, altimeter 350 may generate a value relative to, for example, sea level, and processor/memory 340, potentially in conjunction with location information from GPS receiver 360, may convert the altitude measurement to an altitude measurement relative to ground level.

GPS receiver 360 may include a receiver to receive location and timing information from the GPS satellite system. UAV 210 may use GPS receiver 360 to determine the location of UAV 210. In some implementations, other devices may alternatively or additionally be used to determine the location or orientation of UAV 210. For example, UAV 210 may include a gyroscope and/or compass, which may be used to determine the orientation of UAV 210.

Figure 4A:
FIGS. 4A and 4B are diagrams illustrating example data structures that may be used to optimize communications with UAVs.
Figure 4B:

FIGS. 4A and 4B are diagrams illustrating example data structures 400 and 450, respectively, which may be maintained by, for example, UAV gateway 240. Although a number of fields are shown in data structures 400 and 450, in other examples, data structure 400/450 may include fewer or additional fields. Data structure 400/450 may be particularly used to maintain network description information. The network description information may be received from, for example, UAVs 210, base stations 220, and/or other network elements associated with access network 230.

Data structure 400, as illustrated, may be used, by UAV gateway 240, to track the current state of UAVs 210. Each record of data structure 400 may correspond to information relating to a particular UAV 210 (UAV Identifier (ID)). The UAV ID field may include a value that uniquely identifies a particular UAV 210 (e.g., an International Mobile Station Equipment Identity ("IMEI"), International Mobile Subscriber Identity ("IMSI"), and/or another type of identifier). UAVs 210 (or other devices associated with the access network) may occasionally or periodically transmit an indication of the location of the UAV, such as the geographic location of the UAV (e.g., as obtained from altimeter 350 and/or GPS receiver 360). In some implementations, the geographic location may also include an indication of the altitude of UAV 210. The UAV location field may thus be used by UAV gateway 240 to store locations of UAVs 210. Other information, relating to the state of UAVs 210, may also be maintained in data structure 400. For example, as illustrated, an identifier of the current cell or base station (base station ID), to which the particular UAV 210 is currently attached, may also be stored in data structure 400. Additional information, although not illustrated, such as received signal strength information, may also be tracked by UAV gateway 240.

A number of example records are shown for data structure 400. The first entry corresponds to a UAV that is associated with the unique identifier "UAV1" and is currently at the geographical location corresponding to latitude 38 degrees, longitude −77 degrees, and altitude 100 feet. This UAV is attached to the base station identified as "eNB1" Similarly, for the second entry of data structure 400, the UAV "UAV2" is currently at the geographical location corresponding to latitude 50 degrees, longitude −60 degrees, and altitude 200 feet. This UAV is attached to the base station identified as "eNB2."

Data structure 450, illustrated in FIG. 4B, may be used, by UAV gateway 240, to maintain network description information, such as network description information associated with base stations 220. Each record of data structure 450 may correspond to information relating to a particular base station 220 or to a cell provided by base station 220. As in FIG. 4B, a record may include a "base station ID" field that provides an identifier of a cell or base station. This field "base station location" may provide an indication of the geographic location of the base station (e.g., geographic coordinate value). The field "radiation/antenna patter" may provide information describing the direction or orientation of the radio signals or antennas for the base station. For example, this field may indicate the tilt of the base station (e.g., the orientation of the radio signal relative to horizontal), an angular arc over which the radio signals are transmitted, a height at which the antennas of the base station are positioned, an azimuth angle of the radio signals or antennas of the base station, and/or other parameters describing the transmit radiation pattern of the base station or cell. The field "transmit power" may include one or more values quantifying the current transmit power that is being used by the base station.

Information corresponding to data structure 450 may be received from a variety of sources. For example, the base station locations or other static information relating to the topology of the wireless cellular network may be provided, by administrators of UAV gateway 240 or by other entities. Other information in data structure 450, such as the information relating to the radiation/antenna patterns and/or the transmit power of the base stations, may be periodically or occasionally received from base stations 220. For instance, base stations 220 may be implemented to transmit messages, to UAV gateway 240, to keep the UAV gateway up-to-date on the relevant network description information whenever one of the relevant parameters changes A number of example records are shown for data structure 450. As shown, the first record may be for the base station "eNB1," and may include an indication of the location of the base station (latitude 37 and longitude −77). The "radiation/antenna pattern" field may define the radiation pattern and/or antenna orientation of base station "eNB1" (e.g., the tilt of the antenna is 10 degrees, orientation/azimuth NW) and the "transmit power" field may indicate the corresponding transmit power at which the base station is currently transmitting (e.g., 30 decibel-milliwatts (dBm)). Similarly, the second record in data structure 450 may correspond to the base station "eNB2." The location of the base station may be at latitude 37 and longitude −78, the antenna tilt is 10 degrees, and the primary orientation of the antenna may be South, and the current transmit power may be 35 dBm.

As previously mentioned, UAV 210 may include a multi-faceted antenna 310. UAV 210 may separately measure and track the received signal strength, from nearby base stations 220, on a per-antenna element (per-antenna facet) basis. FIG. 5 is a diagram illustrating an example data structure 500 that may be used by UAV 210 to store the received signal strength values. Although a number of fields are shown in data structure 500, in other examples, data structure 500 may include fewer or additional fields.

Each record of data structure 500 may correspond to signal strength information for a particular antenna facet and for a particular cell. A cell may correspond to particular communication band used by a particular base station. A single base station may simultaneously support multiple cells. As shown, data structure 500 may be used, by UAV 210, to store signal strength values for various antenna facet/cell combinations. The "cell/facet" field may correspond to a particular cell and antenna facet. The "SiNR" field may correspond to a Signal to Interference and Noise Ratio (SiNR) measured value for the particular cell/facet and the "RSSI" field may correspond to a Received Signal Strength Indicator (RSSI) measured value for the particular cell/facet.

In the example of data structure 500, example SiNR and RSSI values are given for different combinations of cells and antenna facets for a particular UAV 210. For example, for the cell/facet combination "Cell1/Facet1," the UAV may have determined the SiNR value as 10 decibel (dB) and the RSSI value as −85 dBm. Similarly, for the cell/facet combination "Cell2/Facet2," the UAV may have determined the SiNR value as 25 dB and the RSSI value as −60 dBm.

Figure 6:
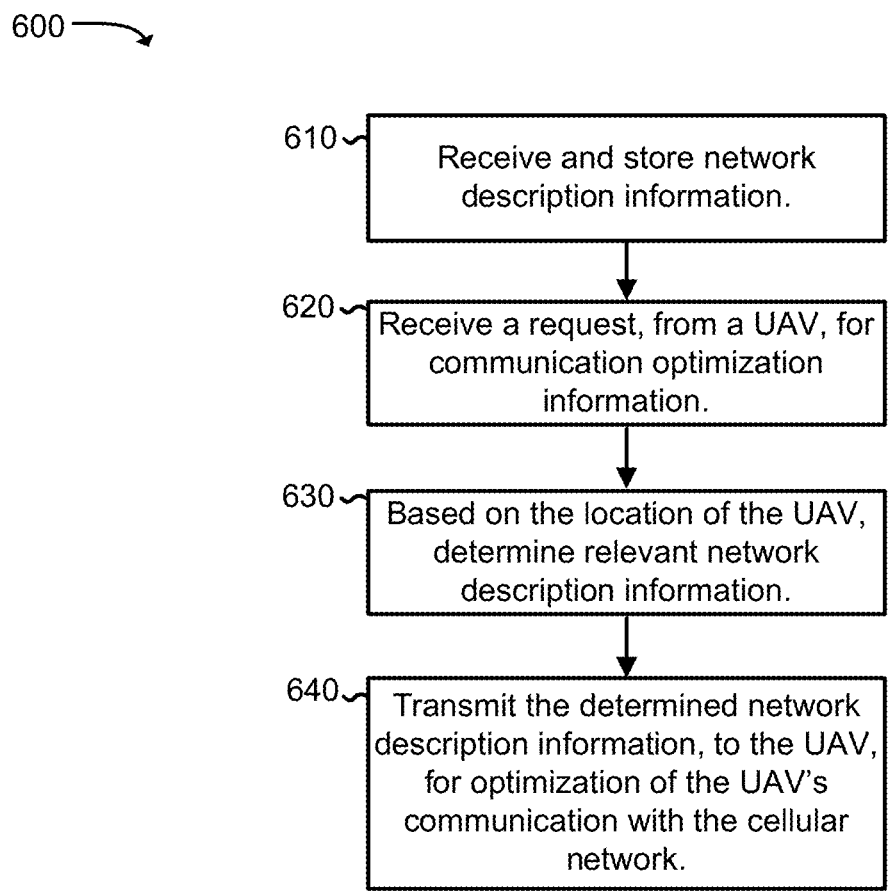
FIGS. 6 and 7 are flowcharts illustrating example processes for optimizing network communication for a UAV.

FIG. 6 is a flowchart illustrating an example process 600 for optimizing network communication for a UAV. Process 600 may be implemented by UAV gateway 240.

Process 600 may include receiving and storing the network description information (block 610). The network description information may be received from, for example, base stations 220, administrators associated with the wireless cellular network, or from other sources. As previously mentioned, the network description information may include, for example, the location of base stations in the network, radiation and or antenna patterns associated with the base stations or with cells provided by the base stations, the transmit power being used by the base stations, or other information. The network description information may be stored in a data structure such as data structure 450.

Process 600 may further include receiving a request, from a UAV, for communication optimization information (block 620). The request may include the current location of the UAV (e.g., a three-dimension coordinate of the UAV). In some implementations, the request may also include an indication of the cell to which the UAV is currently attached. Alternatively or additionally, the cell to which the UAV is currently attached may be obtained, by UAV gateway 240, from other sources (e.g., from base stations 220 or other network devices in access network 230). In some implementations, the request may include other information, such as the current trajectory of the UAV and/or the planned flight path of the UAV.

Process 600 may further include, based on the received location of the UAV, determining relevant network description information (block 630). The relevant network description information may generally be network description information that applies to base stations that are in the vicinity of the UAV. For example, UAV gateway 240 may select the network description information (e.g., from data structure 450) as information corresponding only to the cell to which the UAV is currently attached. In another possible implementation, UAV gateway 240 may select the network description information as the network description information (e.g., from data structure 450) corresponding to all cells or base stations within a certain range (e.g., 1 mile) of the current location of the UAV. Still further, and in another possible implementation, UAV gateway 240 may select the network description information as the network description information corresponding to all base stations that potentially have a coverage area that overlaps a flight path of the UAV.

Process 600 may further include transmitting the determined network description information, to the UAV, for optimization of the UAV's communication with the cellular network (block 640). The UAV may, for example, use the base station location, radiation/antenna pattern, and/or transmit power information to adaptively control antenna 310 of the UAV. For example, the UAV may implement beam forming techniques to adaptively (e.g., based on the current location of the UAV) keep antenna 310 pointed at the base station to which the UAV is attached. Alternatively or additionally, for a multi-faceted antenna, the UAV may adaptively choose which antenna facets to use based on the current position of the base station relative to the UAV.

Figure 7:
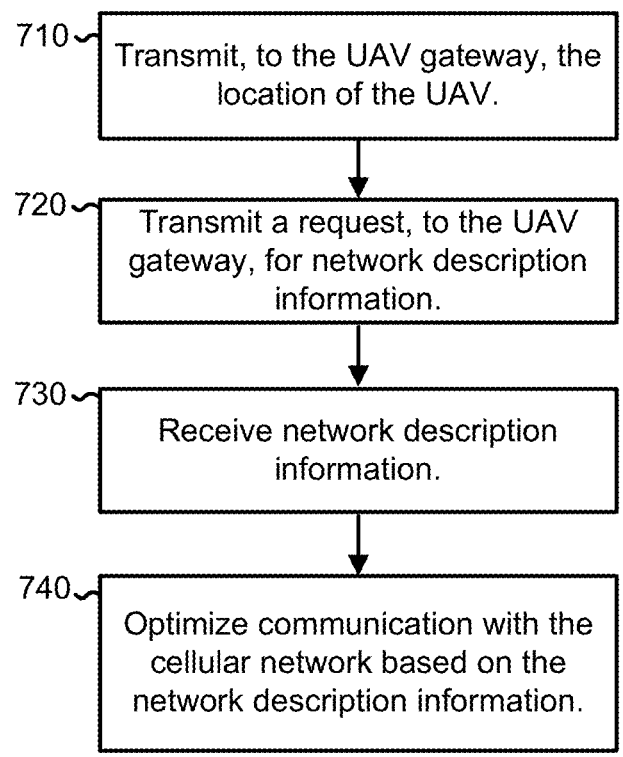

FIG. 7 is a flowchart illustrating an example process 700 for optimizing network communication for a UAV. Process 700 may be implemented by UAV 210.

Process 700 may include transmitting, to UAV gateway 240, the location of the UAV (block 710). In some implementations, other information, such as the current cell to which the UAV is attached and/or the received signal strength information, may also be transmitted by the UAV. In one implementation, the received signal strength information, transmitted to UAV gateway 240 may include the per-antenna and per-cell signal strength information (e.g., as shown in FIG. 5). The UAV may transmit its location, to UAV gateway 240, periodically or occasionally during the flight of the UAV. Through this process, UAV gateway 240 may maintain relatively recent information on the current state of the UAV.

Process 700 may further include transmitting a request, to UAV gateway 240, for network description information (block 720). The request may include the current location of the UAV and may be transmitted using the wireless cellular network. As mentioned with respect to the description of process 600, in response to the request, UAV gateway 240 may determine network description information that is relevant to the UAV (e.g., in block 630). The determined network description information may be information relevant to the UAV's current location in the network.

Process 700 may further include, receiving, by the UAV, network description information from the UAV gateway (block 730). The network description information may be used to optimize communications with the cellular network (block 740). As previously mentioned, the optimizations may include using beam forming techniques to adaptively (e.g., based on the current location of the UAV) keep antenna 310 pointed at the base station to which the UAV is attached. Alternatively or additionally, for a multi-faceted antenna, the UAV may adaptively choose which antenna facets to use based on the current position of the base station relative to the UAV. For example, the UAV may choose the antenna facets that are pointed at the base station and/or that receive the strongest signal strength measurements.

In the description of FIGS. 6 and 7, UAV gateway 240 was described as transmitting the network description information, to UAV 210, in response to an explicit request from UAV 210. Alternatively or additionally, UAV gateway 240 may transmit the network description information at other times (e.g., periodically, in response to changes in the network description information that is relevant to a UAV, in response to an estimation that the UAV has reached a certain way point, etc.).

In some implementations, in addition to providing the network description information to UAV 210, UAV gateway 240 may provide other information to UAV 210, such as suggestions as to potential flight paths, for UAV 210, to optimize network connectivity of UAV 210. As another example, in situations in which UAV 210 provides UAV gateway 240 with trajectory and/or speed information relating to the UAV, UAV gateway 240 may provide a list of cell sites, with potentially optimal connection times for each of the cell sites, to the UAV. For example, the list may include an indication that a first cell, located at a first location, can be optimally used during a first time duration; and a second cell, located at a second location, can be optimally used during a second time duration.

Figure 8:
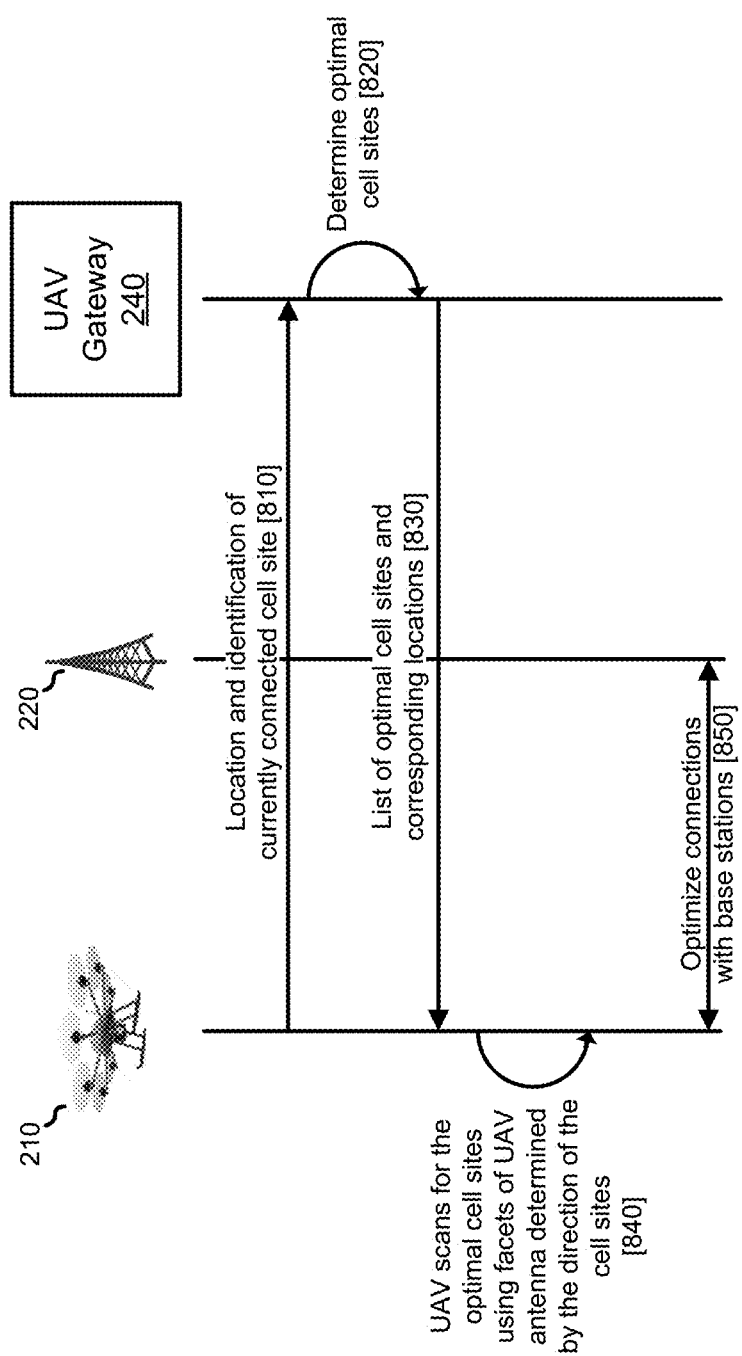
FIG. 8 is a sequence flow diagram of an example implementation for optimizing communications of a UAV over a cellular network.

FIG. 8 is a sequence flow diagram of an example implementation for optimizing communications of a UAV over a cellular network. The sequence flow in FIG. 8 may generally correspond to the operations of processes 600 and 700. In FIG. 8, UAV 210 may communicate with UAV operators 250 (not shown) and UAV gateway 240 using base stations 220 of a wireless cellular network.

At some point, UAV 210 may transmit a location of the UAV and identification of the currently connected cell site (i.e., associated with base station 220) to UAV gateway 240 (message 810). Message 810 may be a request for network description information. In this example, the network description information may include a list of cell sites that are in the vicinity of UAV 210 (or in a flight path of UAV 210) and that UAV gateway 240 determines to be optimal or desirable for UAV 210 to form future connections. UAV gateway 240 may make the determination of the optimal cell sites (at 820) based on, for example, information associated with data structure 450. For example, a cell site may be determined to be optimal if the cell site provides good coverage in an area at which UAV 210 is anticipated to travel. UAV gateway 240 may transmit a list of the optimal cell sites and corresponding geographic locations of the cell sites to UAV 210 (message 830).

UAV 210 may use the list of optimal cell sites (and the corresponding locations of the cell sites) to scan for the cell sites (at 840). For example, UAV 210 may select particular antenna facets to use, to scan particular cell sites, based on the orientation of the facet with respect to the cell site (e.g., for a particular cell site, UAV 210 may only use the antenna facet(s) that are facing the particular cell site). Based on the scanning, UAV 210 may optimally select future connections with cell sites and/or may optimize the quality of the radio connection with the current cell (at 850, "optimize connections with base stations"). For instance, the list of optimal cell sites and corresponding locations may enable UAV 210 to obtain higher signal strength measurements, associated with the cell sites, than if UAV 210 did not have the list of optimal cell sites and the corresponding locations of the cell sites. The signal strength measurements may be transmitted to base station 220 and may be used in future handover decisions.

In implementations in which UAV 210 provides its flight path to UAV gateway 240, UAV gateway 240 may analyze the flight path to determine potential poor connection or lost connection areas. UAV gateway 240 may inform UAV 210 of these areas.

In one implementation, UAV 210 may use the information, from UAV gateway 240, relating to the poor connection or lost connection areas to manage communications during the flight of UAV 210. For example, before entering a poor connection or no connection area, UAV 210 may pause, such as by performing a hover operation, to communicate important data to UAV operators 250. As another example, UAV 210 may use the information relating to the poor connection or no connection areas to modify the flight path to avoid these areas.

In some implementations, UAV 210 may provide feedback to UAV gateway 240 to assist UAV gateway 240 in determining the UAV coverage map of the wireless cellular network. For example, whenever UAV 210 loses connection, UAV 210 may maintain information relating to the lost connection (e.g., the start coordinate of the lost connection, the coordinate of the UAV when a network connections is reestablished, the height and coordinates of the UAV during the coverage outage), and provide this information to UAV gateway 240 when UAV 210 reconnects to the network. UAV gateway 240 may use this information to build a three-dimensional coverage map for the wireless network.

Figure 9:
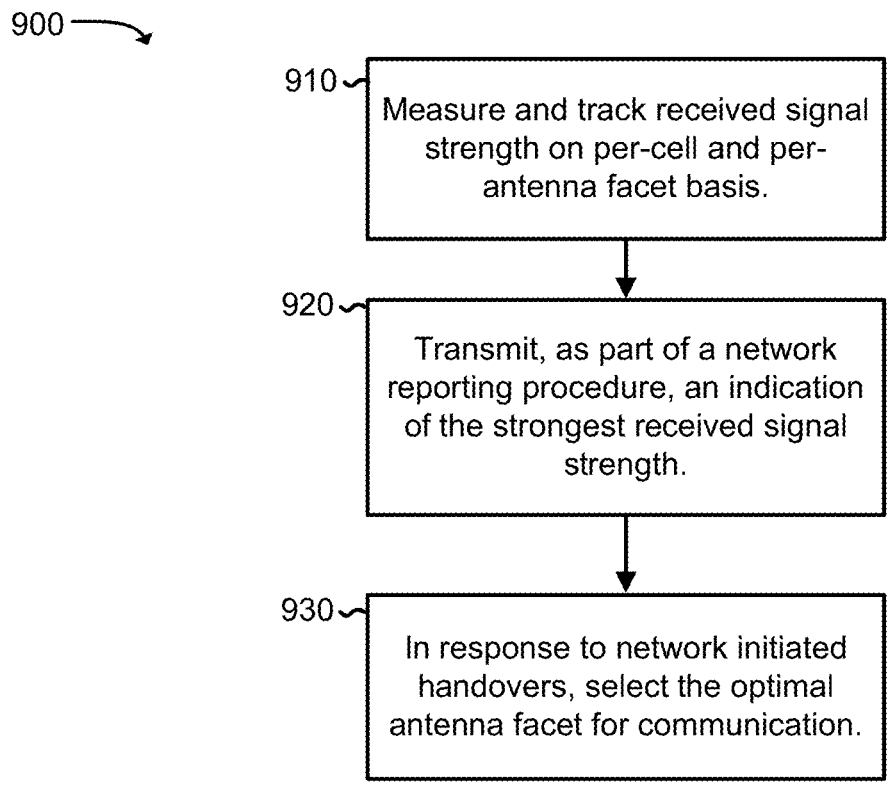
FIG. 9 is a flowchart illustrating an example process for performing a handover operation.

FIG. 9 is a flowchart illustrating an example process 900 for performing a handover operation, for the UAV in the wireless cellular network, consistent with aspects described herein. Process 900 may be implemented by UAV 210.

Process 900 may include measuring and tracking receive signal strength on a per-cell and per-antenna facet basis (block 910). For example, as discussed with reference to data structure 500 (FIG. 5), UAV 210 may measure and store signal strength values, such as SiNR and RSSI values, for each of the various antenna facet/cell combinations that are detectable by UAV 210.

Process 900 may further include transmitting, as part of a network reporting procedure, an indication of the strongest received signal strength (block 920). UAV 210 may select, from the antenna facet/cell combinations, the combination that represents the strongest signal strength. For example, UAV 210 may select, from data structure 500, the strongest measurement(s) of signal strength, and may report this value(s) to the base station to which the UAV is attached. In cellular networks, handovers between base stations may be controlled by the network (e.g., by the base station and by other network devices in access network 230).

Process 900 may further include, in response to a network initiated handover procedure, selecting the optimal antenna facet(s) for communication (block 930). The selection may be based on the per-call and per-antenna facet measurements. For example, UAV 210 may select the optimal antenna facet to use, for communications in the new cell, as the antenna facet that has the highest receive signal strength measurements for the new cell.

Figure 10:
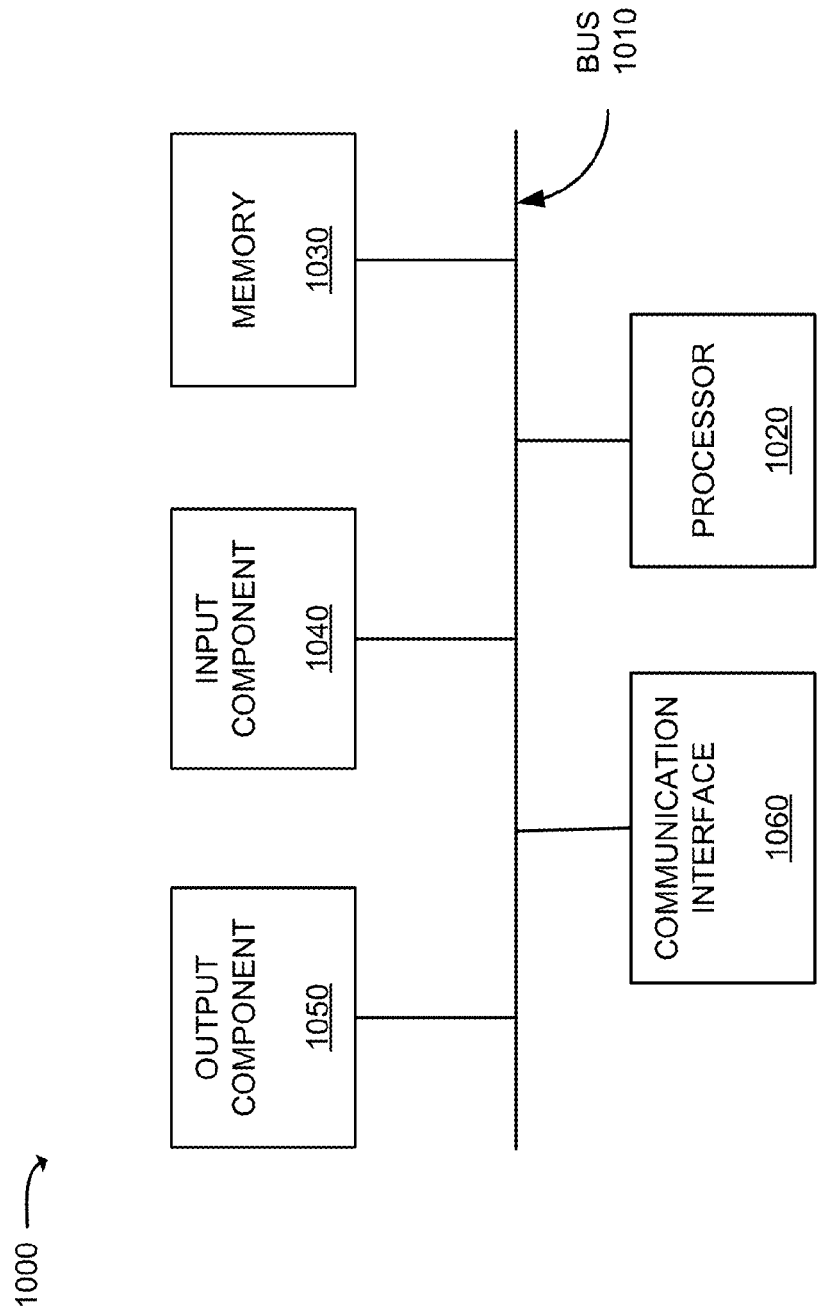
FIG. 10 is a diagram of example components of a device.

FIG. 10 is a diagram of example components of device 1000. One or more of the devices described above (e.g., with respect to FIGS. 1, 2, and/or 8) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or circuitry that may include processing circuitry to interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth radio, a cellular radio transceiver, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks have been described with regard to FIGS. 6, 7, and 9, the order of the blocks may be modified in other implementations. Further, non-dependent blocks may be performed in parallel. Similarly, while series of communications have been described with regard to FIG. 8, the order or nature of the communications may potentially be modified in other implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A gateway device for a wireless network, the gateway device comprising processing circuitry to:

store network description information relating to network connectivity of Unmanned Aerial Vehicles (UAVs) to the wireless network, the network description information including:
  locations of base stations associated with the wireless network, and
  radiation or antenna patterns with which the base stations wirelessly communicate with devices in the wireless network;
receive a request, from a particular UAV, for the network description information, the request including a current location of the UAV;
determine, based on the current location of the UAV, a subset of the network description information as information that applies to base stations in a vicinity of the UAV; and
transmit the subset of the network description information to the UAV.

2. The gateway device of claim 1, wherein the subset of the network description information is determined as information that applies to base stations that are in a flight path of the UAV.

3. The gateway device of claim 1, wherein the current location of the UAV, as received by the gateway, includes an indication of a height of the UAV.

4. The gateway device of claim 1, wherein the network description information additionally includes:
  indications of transmit power of the base stations.

5. The gateway device of claim 1, wherein the subset of the network description information is determined as information to enable the particular UAV to adaptively control a multi-faceted antenna of the particular UAV.

6. The gateway device of claim 1, wherein the processing circuitry is further to:
  determine, based on the network description information, when the particular UAV is expected to lose connection to the wireless network; and
  transmit, to the particular UAV, indications of when the particular UAV is expected to lose connection to the wireless network.

7. The gateway device of claim 1, wherein the radiation or antenna patterns are received, by the gateway device, from the base stations.

8. The gateway device of claim 1, wherein the processing circuitry, when determining the subset of the network description information, is further to:
  determine the subset of the network description information as information corresponding to base stations within a predetermined distance of the current location of the UAV.

9. The method of claim 1, further comprising:
  determining, based on the network description information, when the particular UAV is expected to lose connection to the wireless network; and
  transmitting, to the particular UAV, indications of when the particular UAV is expected to lose connection to the wireless network.

10. A method, implemented by a gateway device for a wireless network, the method comprising:
  storing network description information relating to network connectivity of Unmanned Aerial Vehicles (UAVs) to the wireless network, the network description information including:
    locations of base stations associated with the wireless network, and
    radiation or antenna patterns with which the base stations wirelessly communicate with devices in the wireless network;
  receiving a request, from a particular UAV, for the network description information, the request including a current location of the UAV;
  determining, based on the current location of the UAV, a subset of the network description information as information that applies to base stations in a vicinity of the UAV; and
  transmitting the subset of the network description information to the UAV.

11. The method of claim 10, wherein the subset of the network description information is determined as information that applies to base stations that are in a flight path of the UAV.

12. The method of claim 10, wherein the current location of the UAV, as received by the gateway, includes an indication of the height of the UAV.

13. The method of claim 10, wherein the network description information additionally includes:
  indications of transmit power of the base stations.

14. The method of claim 10, wherein the subset of the network description information is determined as information to enable the particular UAV to adaptively control a multi-faceted antenna of the particular UAV.

15. The method of claim 10, wherein the radiation or antenna patterns are received, by the gateway device, from the base stations.

16. A non-transitory computer-readable medium containing processing instructions for execution by one or more processors to:
  store network description information relating to network connectivity of Unmanned Aerial Vehicles (UAVs) to a wireless network, the network description information including:
    locations of base stations associated with the wireless network, and
    radiation or antenna patterns with which the base stations wirelessly communicate with devices in the wireless network;
  receive a request, from a particular UAV, for the network description information, the request including a current location of the UAV;
  determine, based on the current location of the UAV, a subset of the network description information as information that applies to base stations in a vicinity of the UAV; and
  transmit the subset of the network description information to the UAV.

17. The computer-readable medium of claim 16, wherein the subset of the network description information is determined as information that applies to base stations that are in a flight path of the UAV.

18. The computer-readable medium of claim 16, wherein the current location of the UAV includes an indication of the height of the UAV.

19. The computer-readable medium of claim 16, wherein the network description information additionally includes:
  indications of transmit power of the base stations.

20. The computer-readable medium of claim 16, wherein the subset of the network description information is determined as information to enable the particular UAV to adaptively control a multi-faceted antenna of the particular UAV.

* * * * *